United States Patent
Cheng et al.

(10) Patent No.: US 12,550,629 B2
(45) Date of Patent: Feb. 10, 2026

(54) SELF-ALIGNED, SYMMETRIC PHASE CHANGE MEMORY ELEMENT

(71) Applicant: International Business Machines Corporation, Armonk, NY (US)

(72) Inventors: Kangguo Cheng, Schenectady, NY (US); Zuoguang Liu, Schenectady, NY (US); Juntao Li, Cohoes, NY (US); Arthur Gasasira, Halfmoon, NY (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 17/644,466

(22) Filed: Dec. 15, 2021

(65) Prior Publication Data

US 2023/0189668 A1    Jun. 15, 2023

(51) Int. Cl.
    *H10N 70/20*    (2023.01)
    *H10B 63/00*    (2023.01)
    *H10N 70/00*    (2023.01)

(52) U.S. Cl.
    CPC .......... *H10N 70/231* (2023.02); *H10B 63/80* (2023.02); *H10N 70/023* (2023.02); *H10N 70/063* (2023.02); *H10N 70/066* (2023.02); *H10N 70/068* (2023.02); *H10N 70/8413* (2023.02)

(58) Field of Classification Search
    CPC ............... H10N 70/231; H10N 70/066; H10N 70/8413; H10N 70/063; H10N 70/023; H10N 70/068; H10B 63/80
    USPC ........................................................ 365/163
    See application file for complete search history.

(56) References Cited

U.S. PATENT DOCUMENTS

| | | | |
|---|---|---|---|
| 6,579,760 B1 | 6/2003 | Lung | |
| 7,005,665 B2 | 2/2006 | Furkay et al. | |
| 7,463,512 B2 | 12/2008 | Lung | |
| 7,728,319 B2 | 6/2010 | Goux et al. | |
| 9,070,872 B2 | 6/2015 | Huo et al. | |
| 9,508,927 B1* | 11/2016 | Tao ...................... | H10N 70/061 |
| 10,991,879 B2 | 4/2021 | Ruiz et al. | |
| 2014/0166970 A1* | 6/2014 | Shen ...................... | H10B 63/80 257/4 |
| 2019/0198569 A1* | 6/2019 | Hsu ..................... | G11C 13/0004 |
| 2019/0267428 A1* | 8/2019 | Wu ...................... | H10D 84/038 |
| 2021/0135104 A1 | 5/2021 | Ok et al. | |

(Continued)

OTHER PUBLICATIONS

Wang et al., "Basic Wet-Etching Solutions for Ge2Sb2Te5 Phase Change Material," Journal of The Electrochemical Society, 157 (4) H470-H473 (2010).

(Continued)

*Primary Examiner* — Sung Il Cho
(74) *Attorney, Agent, or Firm* — Kimberly Zillig

(57) ABSTRACT

A phase change memory element including at least one phase change material layer, and a heater conductor, wherein at least a portion of the heater conductor is circumferentially surrounded by the at least one phase change material layer. The phase change memory element is symmetrical. The phase change memory element can include a top electrode circumferentially surrounding and connected to the at least one phase change material layer, and a bottom electrode in contact with the heater conductor. The phase change memory element can include at least one resistive liner in contact with the at least one phase change material layer.

20 Claims, 22 Drawing Sheets

(56) References Cited

U.S. PATENT DOCUMENTS

2021/0257547 A1    8/2021    Shen et al.

OTHER PUBLICATIONS

S. Kim et al., "A phase change memory cell with metallic surfactant layer as a resistance drift stabilizer," 2013 IEEE International Electron Devices Meeting, 2013, pp. 30.7.1-30.7.4, doi: 10.1109/IEDM.2013.6724727.

* cited by examiner

SELF-ALIGNED, SYMMETRIC PHASE CHANGE MEMORY ELEMENT

BACKGROUND

The present disclosure relates to non-volatile, high density, integrated circuit memory devices, and more particularly to such memory devices based upon phase change material, and methods of fabricating the same.

Phase change memory (PCM) is an emerging non-volatile (NV) random-access memory (RAM) that can store information based on a resistance state of a memory element of a memory cell. The memory element includes material that can change between different phases (e.g., crystalline and amorphous phases) when programmed. Different phases of the material can cause the memory cell to have different resistance states with different resistance values. The different resistance states of the memory element can represent different values of the information stored in memory.

One issue with use of PCM is called "resistive drift." Resistive drift is an undesired changing of resistance after a PCM has been programmed, which relates to the amorphous phase, and corresponds to a high resistance state (HRS) of the memory cell.

SUMMARY

According to some embodiments of the disclosure, there is provided a phase change memory element. The phase change element includes at least one phase change material layer; and a heater conductor, wherein at least a portion of the heater conductor is circumferentially surrounded by the at least one phase change material layer.

According to some embodiments of the disclosure, there is provided a method for forming a phase change memory element. The method includes providing a substrate, depositing a dielectric layer on the substrate, and depositing a phase change material layer on the dielectric layer. The method further includes forming a via through the dielectric layer, and the phase change material layer, forming a heater conductor within the via wherein at least a portion of the heater conductor is circumferentially surrounded by the phase change material layer, patterning the phase change material layer, and forming a top electrode circumferentially surrounding and connected to the phase change material layer.

According to some embodiments of the disclosure, there is provided a method for forming a phase change memory element. The method includes providing a substrate, depositing a dielectric layer on the substrate, depositing at least one phase change material layer on the dielectric layer, and depositing at least one resistive liner on the at least one phase change material layer. The method further includes forming a via through the dielectric layer, the at least one phase change material layer, and the at least one resistive liner, forming a heater conductor within the via, wherein at least a portion of the heater conductor is circumferentially surrounded by the at least one phase change material layer and the at least one resistive liner, patterning the at least one phase change material layer and the at least one resistive liner, and forming a top electrode circumferentially surrounding and connected to the at least one phase change material layer and the at least one resistive liner.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
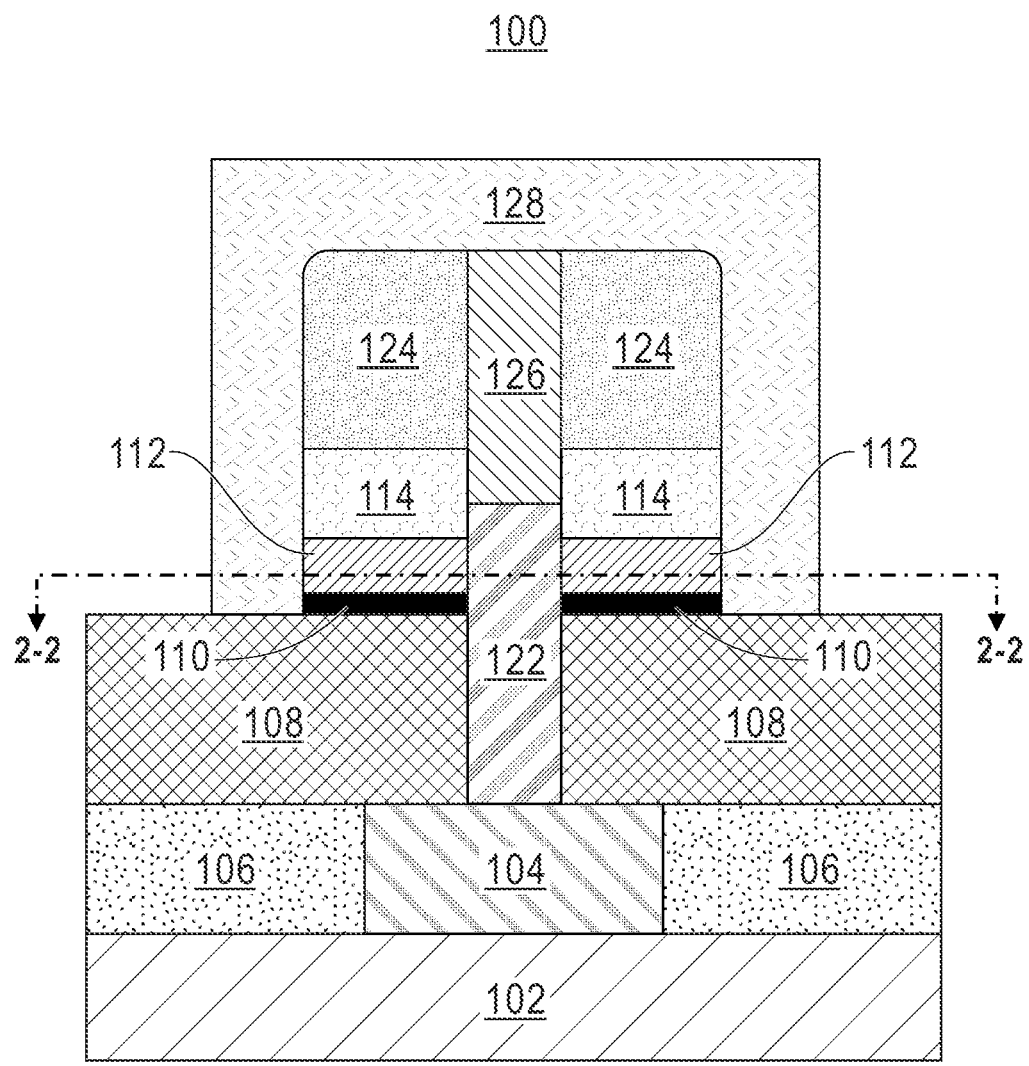
FIG. 1 is a cross-sectional view of a schematic of a memory element, in accordance with embodiments of the disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to non-volatile, high density, integrated circuit (IC) memory devices, and more particularly to such memory devices based upon PCM, and methods of fabricating the same. While the present disclosure is not necessarily limited to such applications, various aspects of the disclosure may be appreciated through a discussion of various examples using this context.

A memory element 100 in accordance with an embodiment of the present disclosure is shown in FIG. 1. It will be understood that FIG. 1 presents, in schematic form, only a portion of a memory cell as finally fabricated and placed in use. Circuit elements are formed both above and below the portion shown in the figure. Memory element 100 can be fabricated using method operations described herein below. The features of memory element 100 are also described in detail below.

It is useful to clarify several matters of terminology. First, it should be noted that the term "memory element" refers to the devices required to provide a location for storing one or more bits of information. A "memory cell" is a combination of a memory element and an element of an access circuit which conventionally consists of a transistor having a gate coupled to a word line, a drain coupled to a contact for connection to the memory element, and a source coupled to a reference line or ground, or consists of a diode having one terminal coupled to a word line or a reference line. The access circuits operate in conjunction with parallel arrays of bit lines and word lines to route signals to appropriate individual memory elements. Other structures can be used for providing access to memory elements, as can be selected by those skilled in the art. Here, the access circuits are preferably located at a level below that of memory element 100, and they are not shown.

Figure 2A:
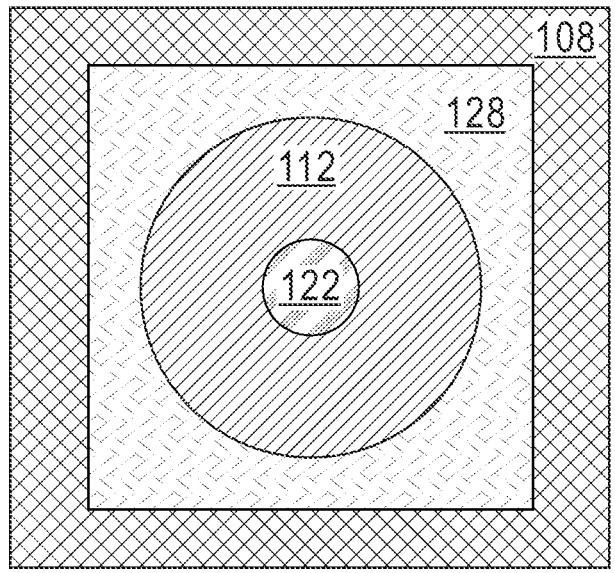
FIG. 2A is a cross-sectional view of a schematic of the memory element of FIG. 1 taken at line 2-2 with phase change material layer of the memory element in a crystalline state, in accordance with embodiments of the disclosure.
Figure 2B:
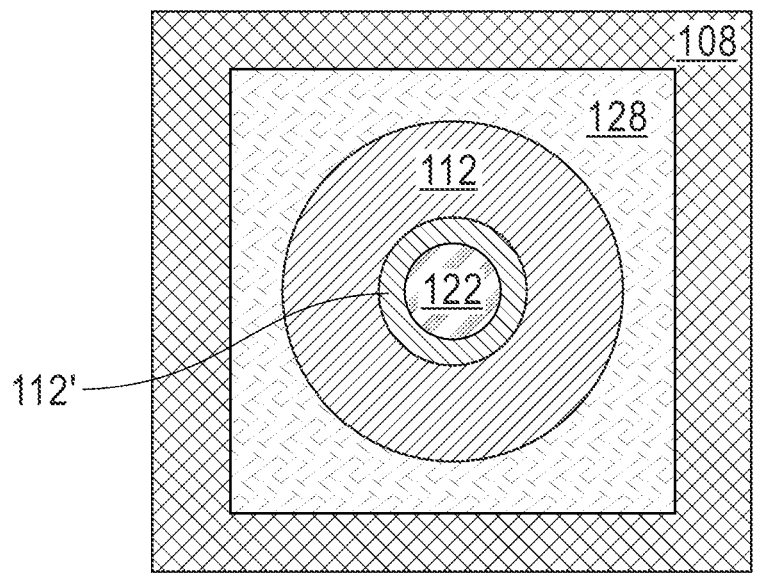
FIG. 2B is a cross-sectional view of a schematic of the memory element of FIG. 1 taken at line 2-2 with phase change material layer of the memory element in a partially amorphous state, in accordance with embodiments of the disclosure.

FIGS. 2A and 2B are schematic, cross-sectional views taken at line 2-2 in FIG. 1 at two different phases of memory element 100, for example. FIG. 2A shows the memory element 100 while a phase change material layer 112 is in a crystalline state. FIG. 2B shows the memory element while in a partial amorphous state, with a portion of the phase change material layer 112 being amorphous, and indicated as 112'. The amorphous portion 112' is surrounding and adjacent a heater conductor 122 of memory element 100, and can be amorphous while electricity is conducted through heater conductor 122, for example. The features shown in FIGS. 2A and 2B will be discussed in detail herein below with regard to fabrication of the memory element 100.

For the sake of brevity, conventional techniques related to semiconductor device or IC chip fabrication may or may not be described in detail herein. Moreover, the various tasks and process operations described herein can be incorporated into a more comprehensive procedure or process having additional operations or functionality not described in detail herein. In particular, various operations in the manufacture of semiconductor devices or ICs are well known and so, in the interest of brevity, many conventional operations will only be mentioned briefly herein or will be omitted entirely without providing the well-known process details.

Figure 3:
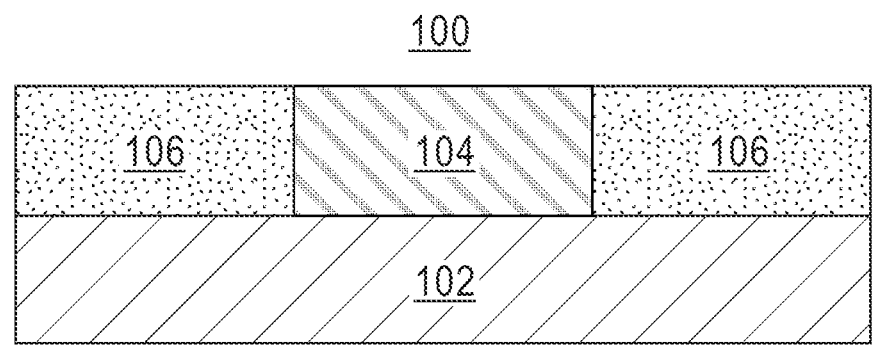
FIG. 3 is a cross-sectional view of a schematic of the memory element of FIG. 1 at a first of successive fabrication stages/steps/operations of a method or process to make the memory element, in accordance with embodiments of the disclosure.

Example methods of fabricating the memory element 100 are shown in cross-sectional views at fabrication stages starting in FIG. 3. Starting with FIG. 3, a substrate 102 is provided as shown. The substrate 102 can be any semiconductor substrate, which can comprise other devices such as transistors, isolation structures, contacts, etc. A bottom electrode 104 is formed on a portion of an upper surface of the substrate 102 in a center area of the substrate 102. The bottom electrode 104 is surrounded by a first dielectric layer 106. The bottom electrode 104 can be formed, for example, by a conventional complementary metal-oxide semiconductor (CMOS) back end-of-line (BEOL) damascene process (e.g., tungsten, cobalt, or copper surrounded by low-k dielectric), for example. Other suitable processes and materials may be used, however, for the bottom electrode 104. The first dielectric layer 106 can include one or more dielectric materials, including but not limited to, silicon nitride (SiN), silicon carbide (SiC), silicon oxynitride (SiON), carbon-doped silicon oxide (SiOC), carbon doped silicon oxide (SiO:C), fluorine-doped silicon oxide (SiO:F), silicon-carbon-nitride (SiCN), boron nitride (BN), silicon boron nitride (SiBN), silicoboron carbonitride (SiBCN), silicon oxycarbonitride (SiOCN), silicon oxide (SiO), boron carbon nitride (BCN), hydrogen silsesquioxane polymer (HSQ), methyl silsesquioxane polymer (MSQ), methyl doped silica (SiO:(CH$_3$)), organosilicate glass (SiCOH), porous SiCOH, and any suitable combinations thereof. The first dielectric layer 106 can be formed by any suitable deposition technique, including but not limited to, chemical vapor deposition (CVD), spin-on, atomic layer deposition (ALD), etc.

Figure 4:
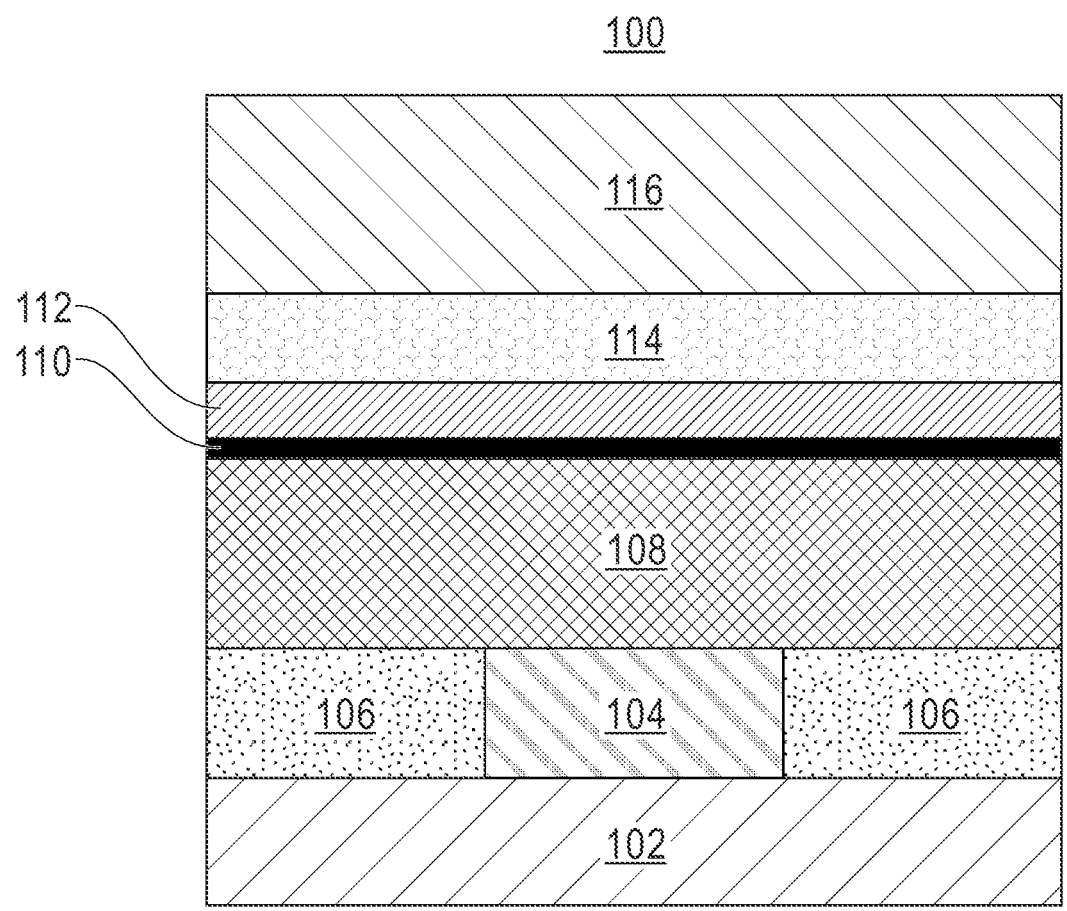
FIG. 4 is a cross-sectional schematic view illustrating a process operation following that of FIG. 3, in accordance with embodiments of the disclosure.

FIG. 4 shows the structure after deposition of four additional layers, which would be deposited one at a time in successive operations, atop the bottom electrode 104 and first dielectric layer 106. The first of the four layers deposited is a second dielectric layer 108 that is above and in electrical contact with a top surface of the bottom electrode 104 and a top surface of the first dielectric layer 106. An example material for the second dielectric layer 108 is SiN, although other materials are also contemplated. The second dielectric layer 108 can be applied using CVD, ALD, and physical vapor deposition (PVD), although other processes are contemplated.

The second of the four layers deposited above the second dielectric layer 108 is a resistive liner 110. The resistive liner 110 material can be, for example, aluminum nitride (AlN), BN, aluminum oxide (AlO), tantalum nitride (TaN), titanium nitride (TiN), tungsten nitride (WN), cobalt tungsten (CoW), nickel tungsten (NiW), or yttrium oxide (YO). The resistance of resistive liner 110 is substantially greater than the resistance of heater conductor 122 (e.g., five to fifty times higher, or about twenty times higher). Furthermore, the resistance of resistive liner 110 is substantially greater than the resistance of phase change material layer 112 in a low resistance, polycrystalline state (e.g., ten to forty times higher, or about twenty times higher) and substantially lower than the resistance of phase change material layer 112 in high resistance, amorphous state (e.g., five to fifty times lower, or about ten times lower). The resistivity of resistive liner 110 can be, for example, in the range of 0.1 ohm micrometers ($\Omega\mu m$) to 1 kiloohm micrometers ($k\Omega\mu m$). The resistive liner 110 can be deposited by any suitable technique, including but not limited to ALD, PVD, CVD, etc.

The resistive liner 110, for example, can migrate resistance drift. Such a resistive liner, in general, can migrate resistive drift in a confined PCM cell. In a confined PCM cell, a resistive liner is formed in parallel with the PCM in a vertical via. The resistance of such a resistive liner is higher than that of PCM in a low resistance state (LRS) but lower than that of PCM in a HRS. The resistance drift is migrated by the resistive liner as the resistive liner shunts read current in the amorphous PCM. Embodiments described herein adopt a resistive liner in order to migrate resistance drift.

The third of the four layers deposited, as shown in FIG. 4, and which is applied above the resistive liner 110, is the layer of phase change material 112. One example alloy material that can be used for the phase change material layer 112 is germanium-antimony-tellurium (Ge/Sb/Te) (otherwise known as "GST"). However, the phase change material layer 112 can be fabricated from a number of different phase change materials, including but not limited to, Si—Sb—Te (silicon-antimony-tellurium) alloys, Ga—Sb—Te (gallium-antimony-tellurium) alloys, Ge—Bi—Te (germanium-bismuth-tellurium) alloys, In—Te (indium-tellurium) alloys, As—Sb—Te (arsenic-antimony-tellurium) alloys, Ag—In—Sb—Te (silver-indium-antimony-tellurium) alloys, Ge—In—Sb—Te alloys, Ge—Sb alloys, Sb—Te alloys, Si—Sb alloys, and combinations thereof. In some embodiments, the phase change material can further include nitrogen, carbon, and/or oxygen. In some embodiments, the phase change material can be doped with dielectric materials including but not limited to $Al_2O_3$, SiO, $Ta_2O_5$, $HfO_2$, zirconium oxide ($ZrO_2$), cerium oxide ($CeO_2$), SiN, SiON, etc.

Phase change alloys are capable of being switched between a first structural state in which the material is in a generally amorphous solid phase, and a second structural state in which the material is in a generally crystalline solid phase in its local order in the active channel region of the cell. These alloys are at least bistable. The term "amorphous" is used to refer to a relatively less ordered structure, more disordered than a single crystal, which has the detectable characteristics such as higher electrical resistivity than the crystalline phase. The term "crystalline" is used to refer to a relatively more ordered structure, more ordered than in an amorphous structure, which has detectable characteristics such as lower electrical resistivity than the amorphous phase. Typically, phase change materials can be electrically switched between different detectable states of local order across the spectrum between completely amorphous and completely crystalline states. An example method for forming chalcogenide material uses PVD, sputtering, magnetron-sputtering, CVD, or ALD.

Next, in FIG. 4, a third dielectric layer 114 is shown deposited atop the phase change material layer 112. An example material for the third dielectric layer 114 is SiN, although other materials are contemplated. The third dielectric layer 114 can include one or more dielectric materials, including but not limited to, SiN, SiC, SiON, SiOC, SiO:C, SiO:F, SiCN, BN, SiBN, SiBCN, SiOCN, SiO, BCN, HSQ, MSQ, SiO:($CH_3$), SiCOH, porous SiCOH, and any suitable combinations thereof. The third dielectric layer 114 can be formed by any suitable deposition technique, including but not limited to, CVD, spin-on, ALD, etc.

Also in FIG. 4, a sacrificial layer 116 is shown deposited on top of the third dielectric layer 114. An example material for the sacrificial layer 116 is silicon dioxide ($SiO_2$), although other materials are contemplated. The sacrificial layer 116 can be deposited by CVD, although other deposition techniques such as spin-on and PVD are contemplated. Above the sacrificial layer, a block mask layer 118 can be deposited (shown in FIG. 5). The block mask layer can be a softmask layer such as optical planarization layer (OPL), anti-reflection layer, and photoresist. Alternatively, the block mask layer 118 can be a hardmask layer such as amorphous silicon or amorphous silicon germanium. The block mask layer 118 can be deposited by, for example, spin-on, PVD, or CVD, although other deposition techniques are contemplated.

Figure 5:
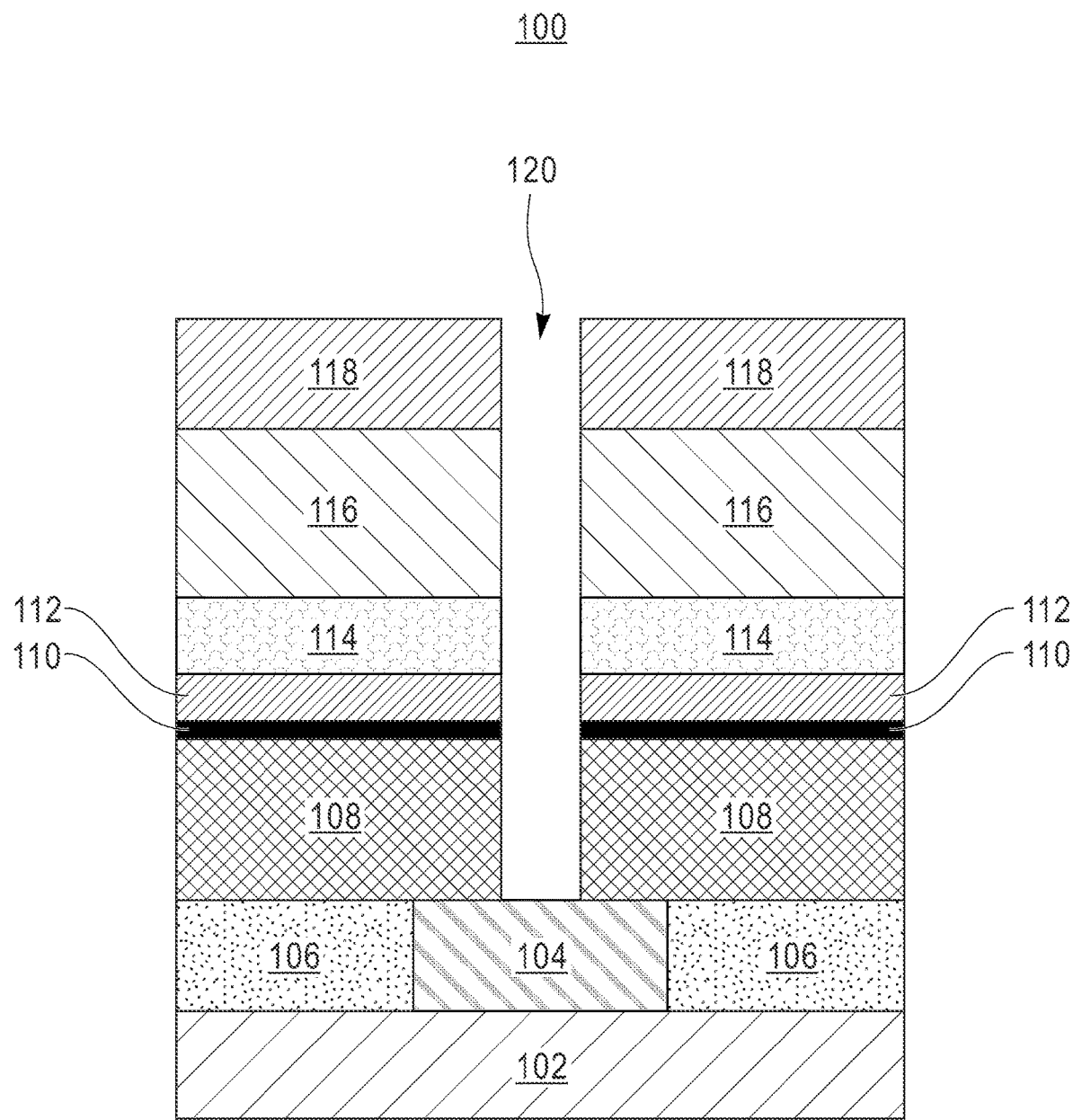
FIG. 5 is a cross-sectional schematic view illustrating a process operation following that of FIG. 4, in accordance with embodiments of the disclosure.
Figure 6:
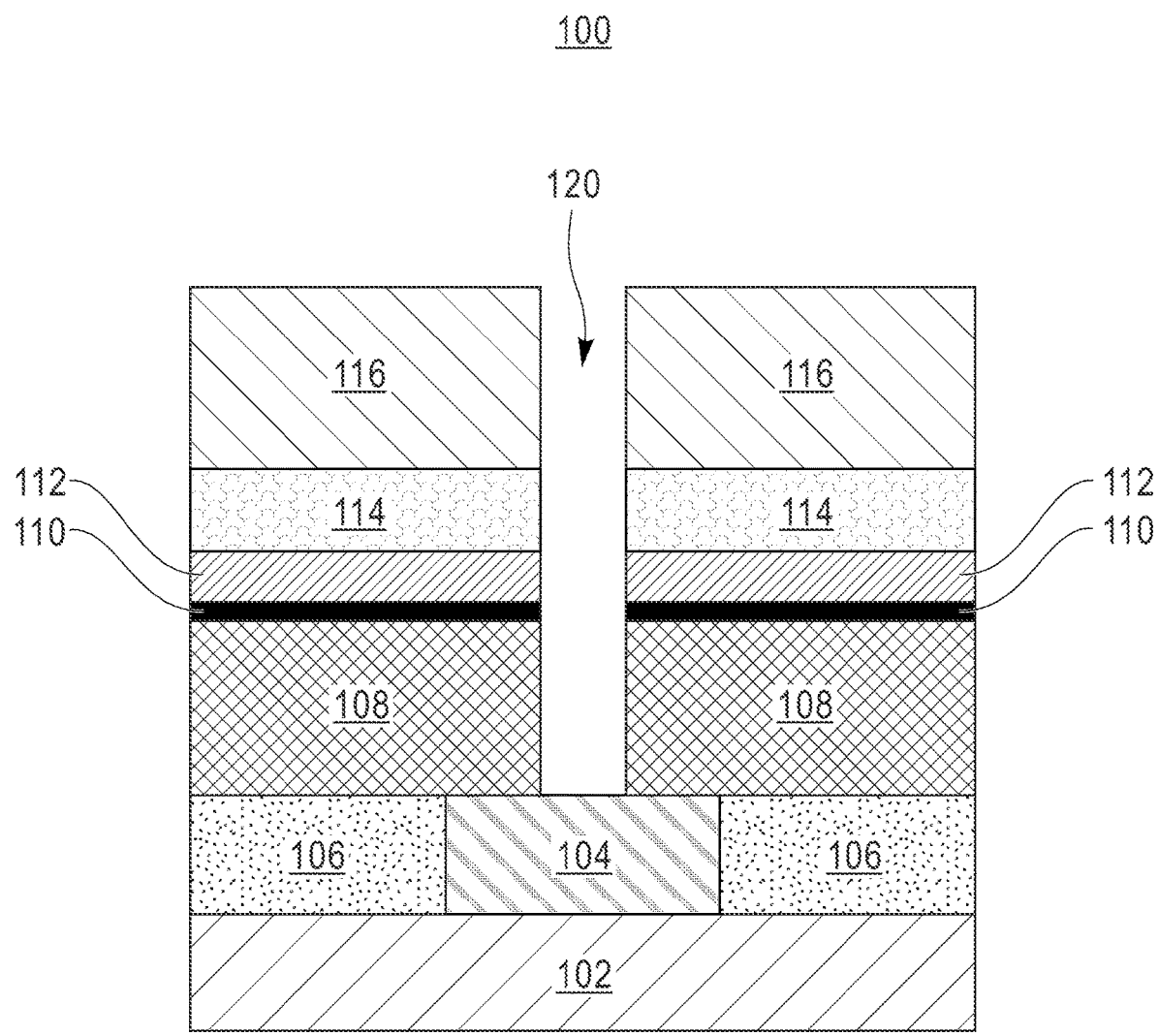
FIG. 6 is a cross-sectional schematic view illustrating a process operation following that of FIG. 5, in accordance with embodiments of the disclosure.

FIG. 5 illustrates the structure from FIG. 4, including the block mask layer 118, after patterning to form a via 120 reaching the bottom electrode 104. The via 120 is located at or near the center of the structure and extends vertically (i.e., along y-axis) from the top of the structure, through some of the layers of the structure, and down to the bottom electrode 104. Patterning the via can be performed using a directional etching process (e.g., reactive ion etch (RIE)) or other suitable processes. FIG. 6 shows the structure after the next operation, which is after removal of the block mask layer 118. The block mask layer can be removed by, for example, ashing or any other suitable technique.

Figure 7:
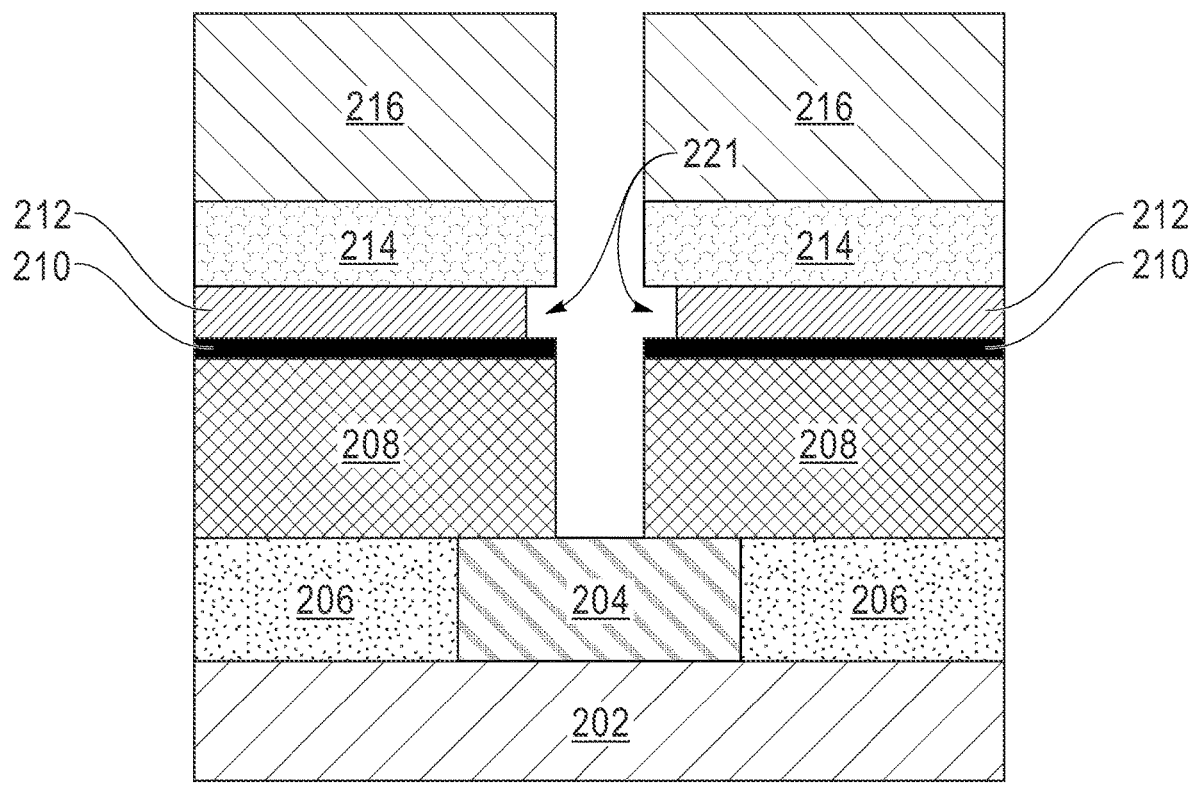
FIG. 7 is a cross-sectional schematic view illustrating an alternative process operation to that of FIG. 6 and following that of FIG. 5, in accordance with embodiments of the disclosure.

FIG. 7 is an alternative, resultant structure to that of FIG. 6 and after the patterning process is performed to form a via in the structure, subsequent to FIG. 5. The layers in FIG. 7 are labelled with a "2" as their first number rather than a "1" as in FIG. 6, and are corresponding layers to those in the embodiment of FIG. 6. The discussion of the materials and methods of forming the layers herein with regard to the embodiment of FIGS. 1, 3-6, 8, 10, 12, 14, 16, 18 and 20 also applies to the embodiment of FIGS. 7, 9, 11, 13, 15, 17, 19, 21 and 22. The difference between FIG. 6 and FIG. 7 is a presence of etched portions 221 of phase change material layer 212 that are located within and/or adjacent via 220. During the patterning process (e.g., isotropic etching process) used to form the via 220, the sidewalls of the phase change material layer 212 can be damaged. The damaged portions can be removed using, e.g., lateral etching. Lateral etching of the phase change material layer 212 can expose tips of resistive liner 210.

Following the patterning process used to form vias 120, 220, next, a preclean process can be used to access or clean the tips of the resistive layer 212 and bottom electrodes 104, 204 (used for bottom electrodes in both embodiments of FIGS. 6 and 7) prior to a next operation in the fabrication process described below. Such a process includes deposition of heater conductor material to form a heater conductor 122, 222. An example preclean process is an argon sputtering/ hydrogen plasma process, which can be in situ or ex situ in order to clean the surface of the resistive liner 210 and bottom electrodes 104, 204.

Figure 8:
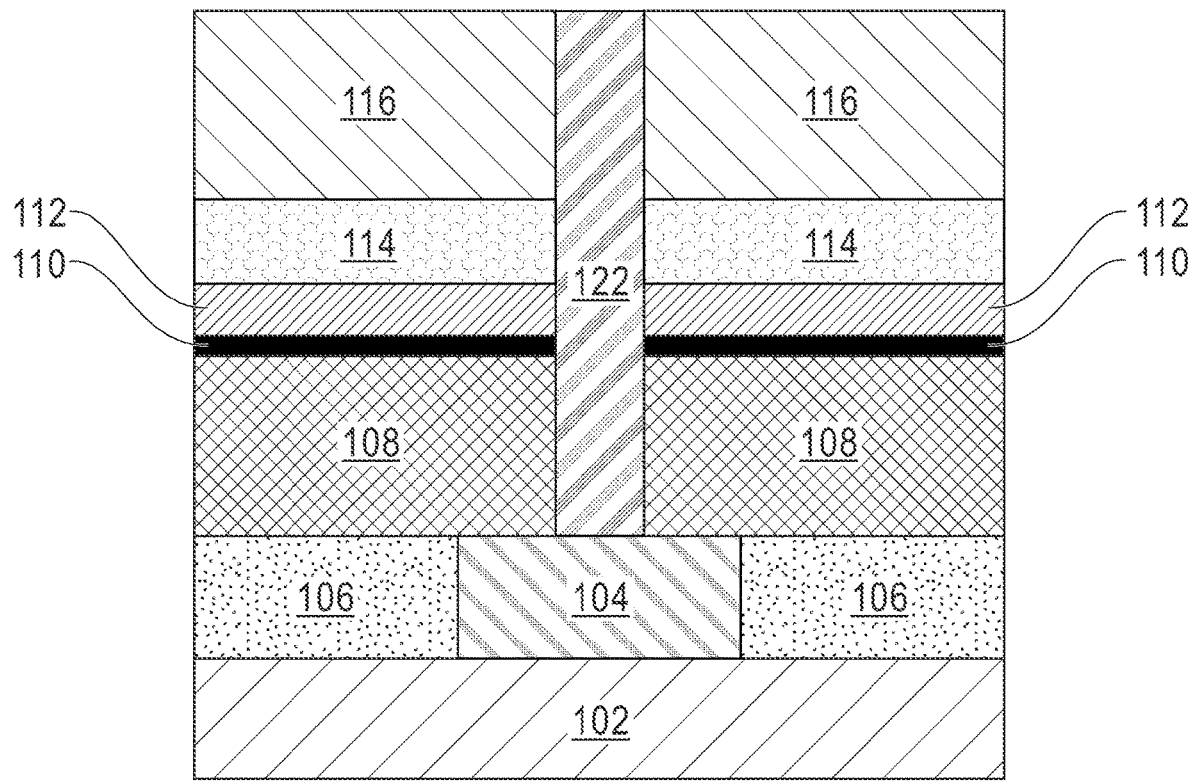
FIG. 8 is a cross-sectional schematic view illustrating a process operation following that of FIG. 6, in accordance with embodiments of the disclosure.
Figure 9:
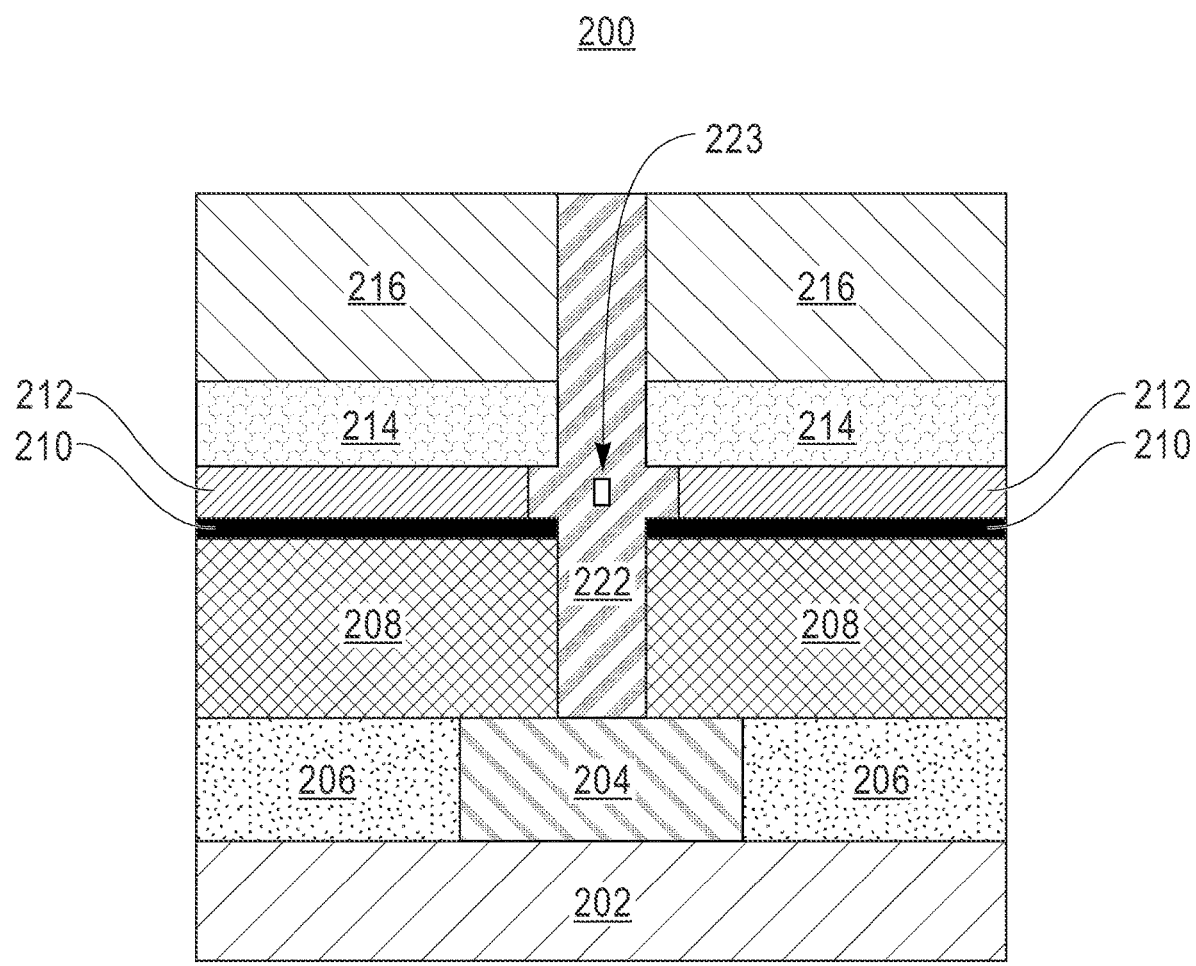
FIG. 9 is a cross-sectional schematic view illustrating a process operation following that of FIG. 7, in accordance with embodiments of the disclosure.

FIGS. 8 and 9 illustrate the next operation in the fabrication process, which is addition of heater conductor 122, 222. The heater conductor 122, 222 can be formed in the corresponding via 120, 220 using conformal deposition, for example, although other suitable processes are contemplated. The heater conductor 122, 222 can be made of a single material (e.g., TiN) or multiple-layered materials (e.g., TaN/TiN/TaN). Other suitable, conductive materials are also contemplated. Other heater conductor materials include: hafnium nitride (HfN), niobium nitride (NbN), WN, tungsten carbon nitride (WCN), or combinations thereof. The heater conductor 122, 222 can be deposited in the trench(es) by ALD, CVD, metal organic CVD (MOCVOD), plasma-enhanced CVD (PECVD), or combinations thereof. As shown in FIG. 9, after the metal fill is deposited in the embodiment including etched portions 221 (see FIG. 7) to form the heater conductor 222, a void 223 (or seam) is formed at or near the middle of the heater conductor 222 in the area of the etched portions 221.

Figure 10:
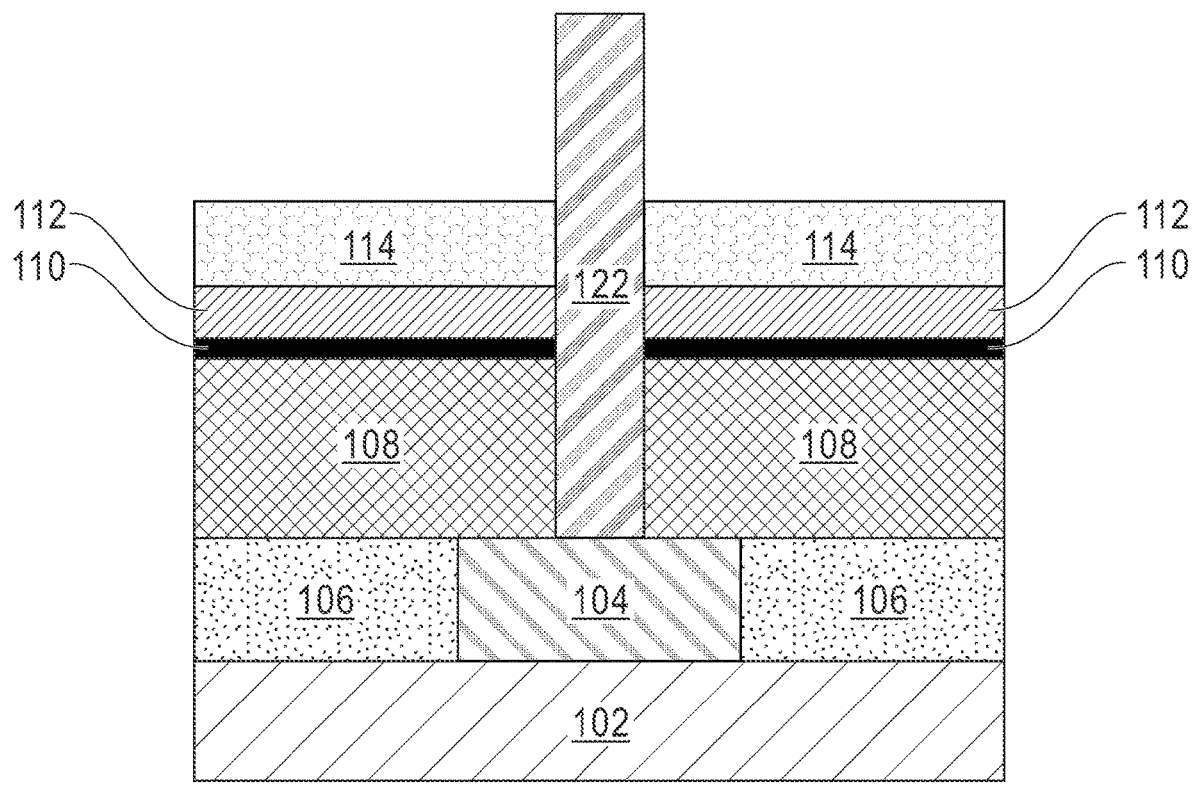
FIG. 10 is a cross-sectional schematic view illustrating a process operation following that of FIG. 8, in accordance with embodiments of the disclosure.
Figure 11:
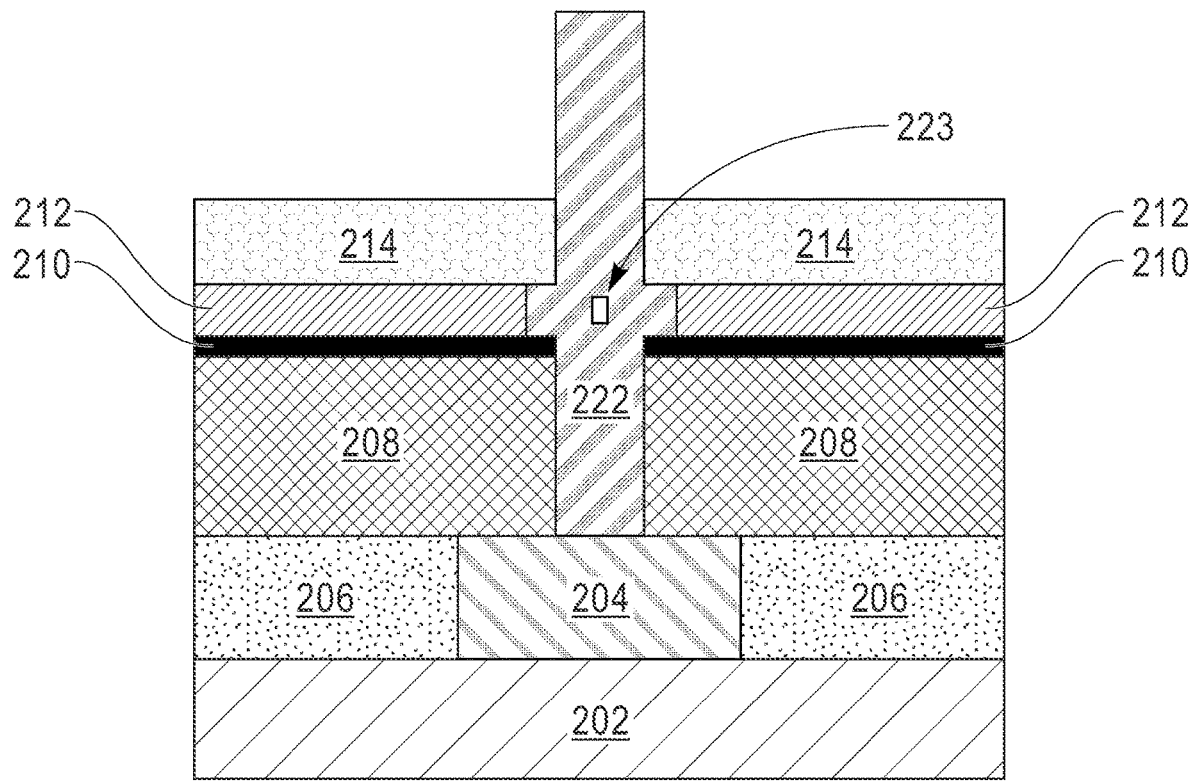
FIG. 11 is a cross-sectional schematic view illustrating a process operation following that of FIG. 9, in accordance with embodiments of the disclosure.

FIGS. 10 and 11 show the next operation of the process, which is removal of sacrificial layer 116, 216 to expose a portion of the heater conductor 122, 222. The sacrificial layer 116, 216 can be removed by any suitable dry etch (e.g., plasma etching) or wet etching, selective to heater conductor. Portions of the heater conductor 122, 222 then extends upward above the third dielectric layer 114, 214.

Figure 12:
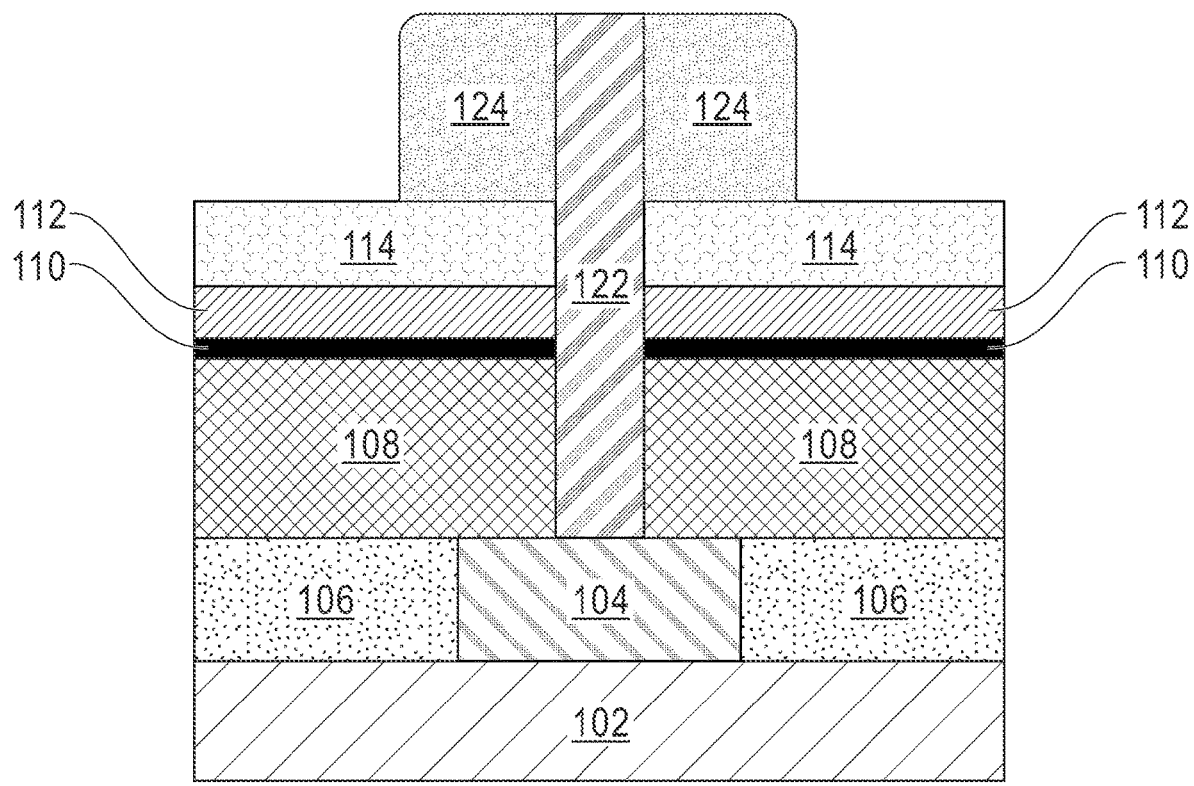
FIG. 12 is a cross-sectional schematic view illustrating a process operation following that of FIG. 10, in accordance with embodiments of the disclosure.
Figure 13:
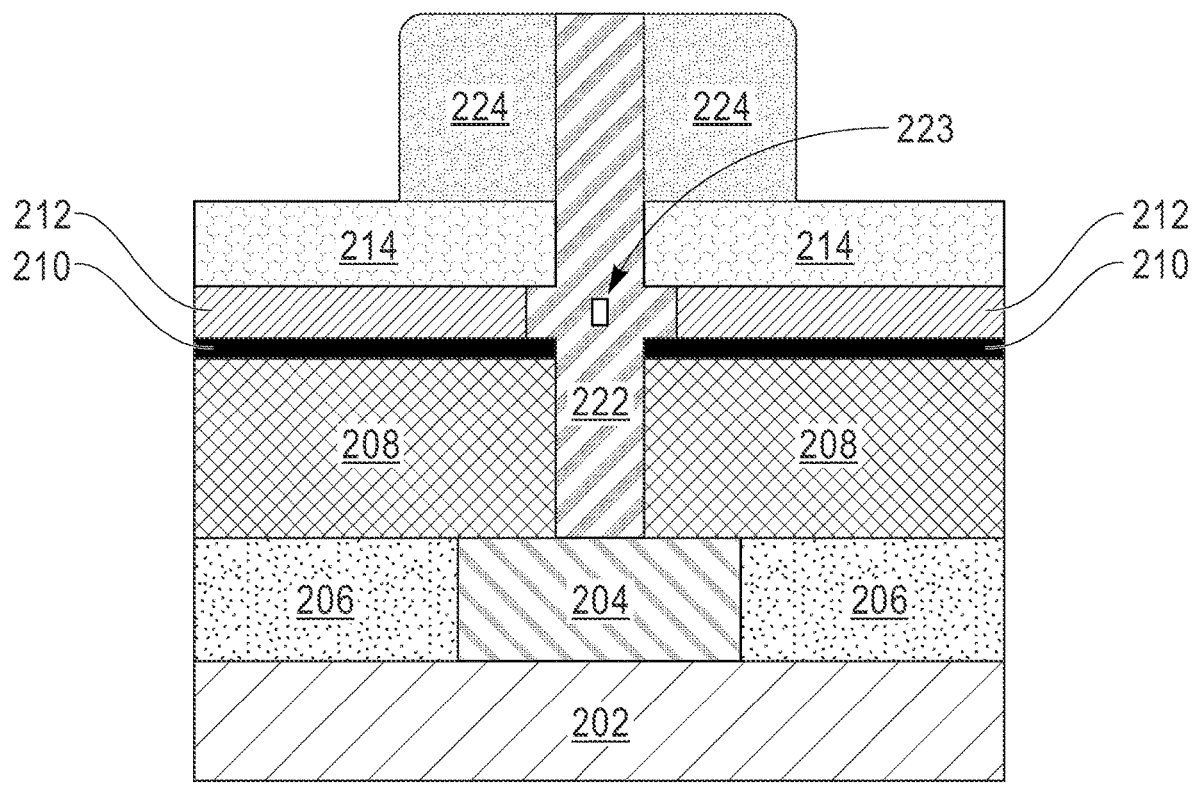
FIG. 13 is a cross-sectional schematic view illustrating a process operation following that of FIG. 11, in accordance with embodiments of the disclosure.

FIGS. 12 and 13 show a following operation, in which a spacer 124, 224 is added surrounding the portion of the heater conductor 122, 222 that extends above the third dielectric layer 114, 214 as in the previous operation (see FIGS. 10 and 11). The spacer 124, 224, can be formed in two operations by depositing a material (e.g., SiN) around heater conductor 122, 222, and following material deposition (e.g., by CVD) by a directional etch (e.g., reactive-ion etching (RIE)). Other suitable materials (e.g., SiON, SiCN, SiOCN, SiBCN, SiOC) and methods for forming a spacer are also contemplated.

Figure 14:
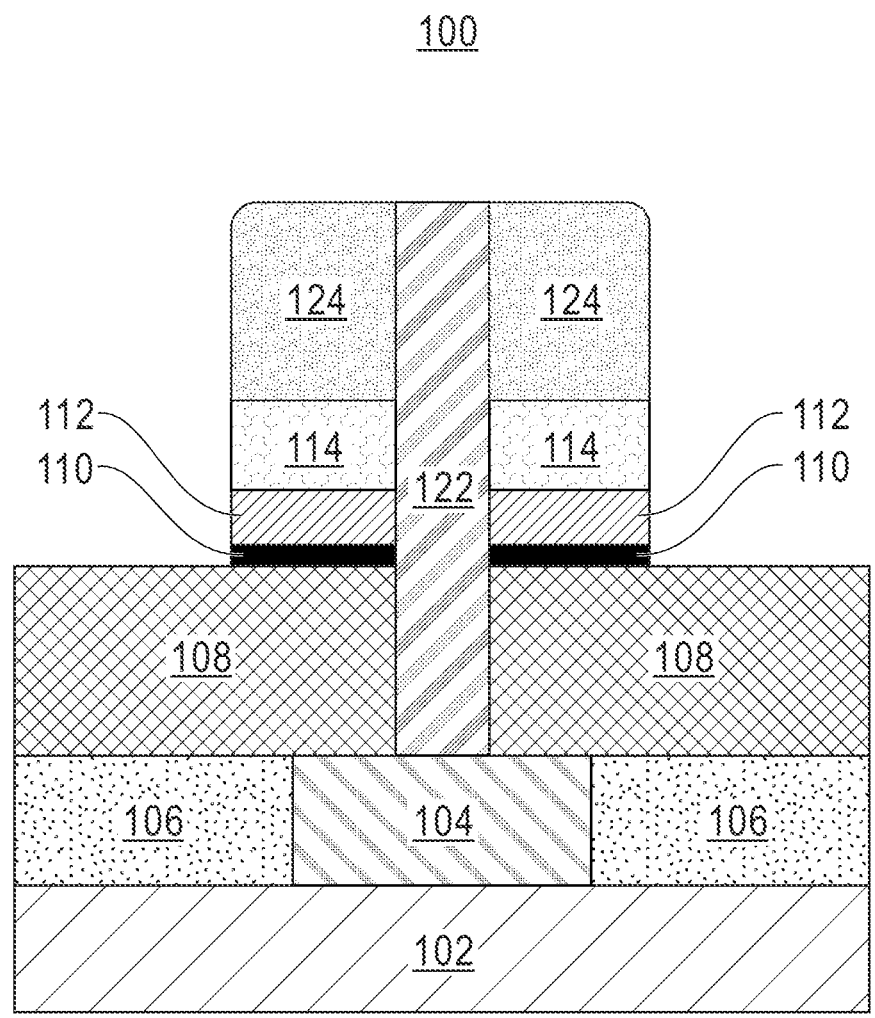
FIG. 14 is a cross-sectional schematic view illustrating a process operation following that of FIG. 12, in accordance with embodiments of the disclosure.
Figure 15:
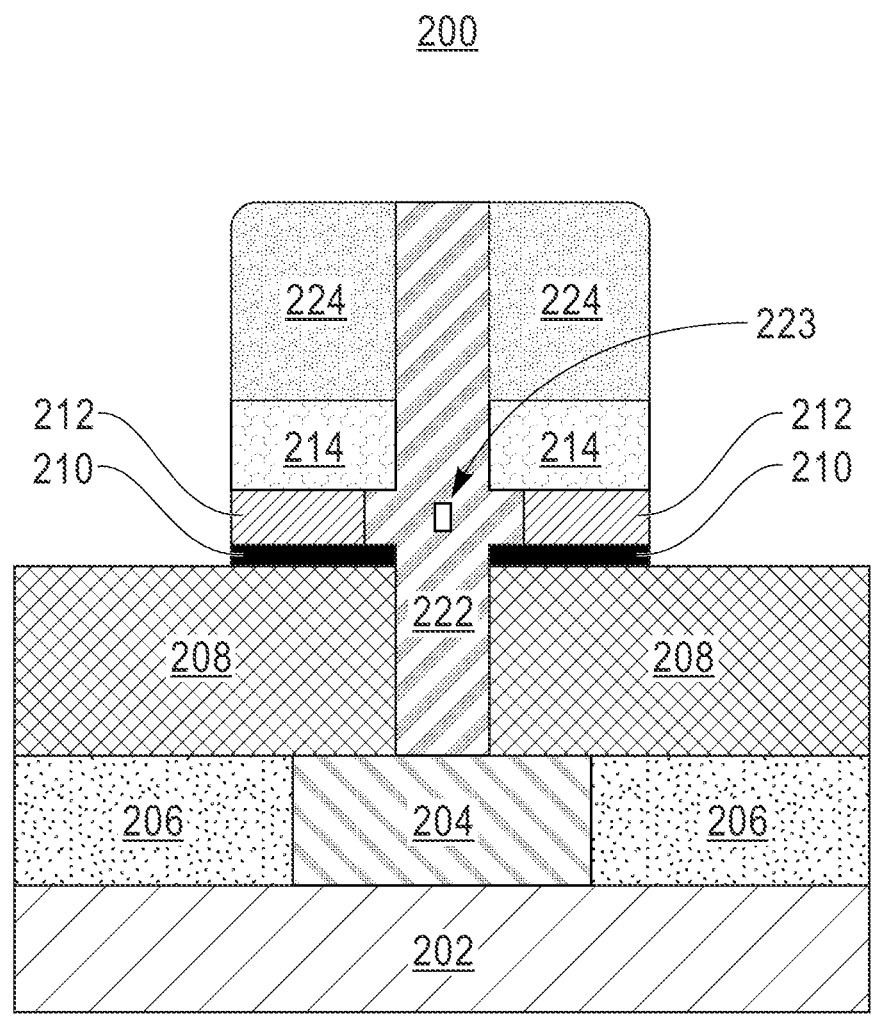
FIG. 15 is a cross-sectional schematic view illustrating a process operation following that of FIG. 13, in accordance with embodiments of the disclosure.

FIGS. 14 and 15 show resultant structures after the next operation, which is to use a combination of the heater conductor 122, 222 and the spacer 124, 224 as a mask to pattern the three layers below the spacer 124, 224. The three layers that are patterned are the third dielectric layer 114, 214, the phase change material layer 112, 212, and the resistive liner 110, 210. The patterning process involves directive ion etch (RIE) and/or ion beam etching. The spacer 124, 224 has a uniform lateral thickness, which allows the patterning process to result in a symmetric phase change material layer 112, 212 and symmetric resistive liner 110, 210 that are self-aligned with the heater conductor 122, 222. The symmetrical feature of the phase change material layer 112, 212 and the resistive liner 110, 210 is an advantage to the resultant memory cell because it enables the same distance from the edge of the heater conductor 122, 222 to the edge of the later formed on top electrode (128, 228, discussed below). In other words, the lateral dimension of the phase change material layer 112, 212 between the heater conductor 122, 222 and the later formed on top electrode 128, 228 is substantially the same as it is defined by the spacer 124, 224 thickness. The uniform dimension of phase change material layer 112, 212 between heater conductor 122, 222 and top electrode 128, 228 reduces the variation of phase change memory cell.

Figure 16:
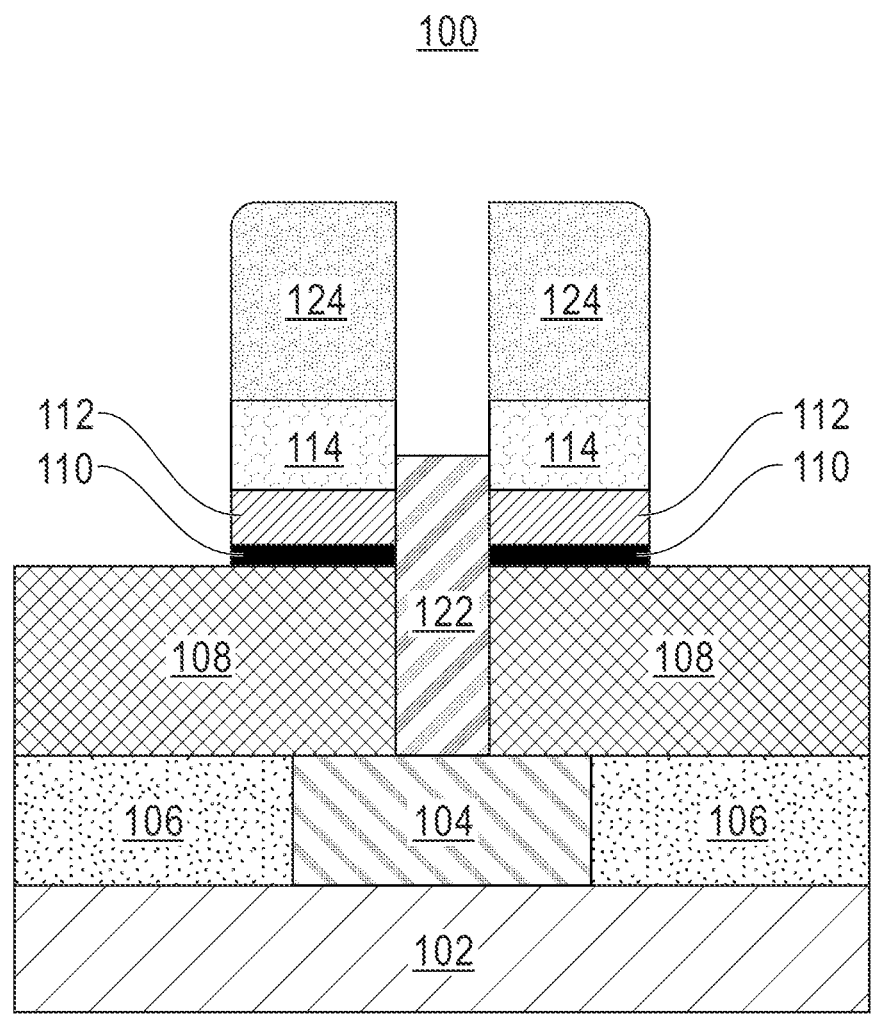
FIG. 16 is a cross-sectional schematic view illustrating a process operation following that of FIG. 14, in accordance with embodiments of the disclosure.
Figure 17:
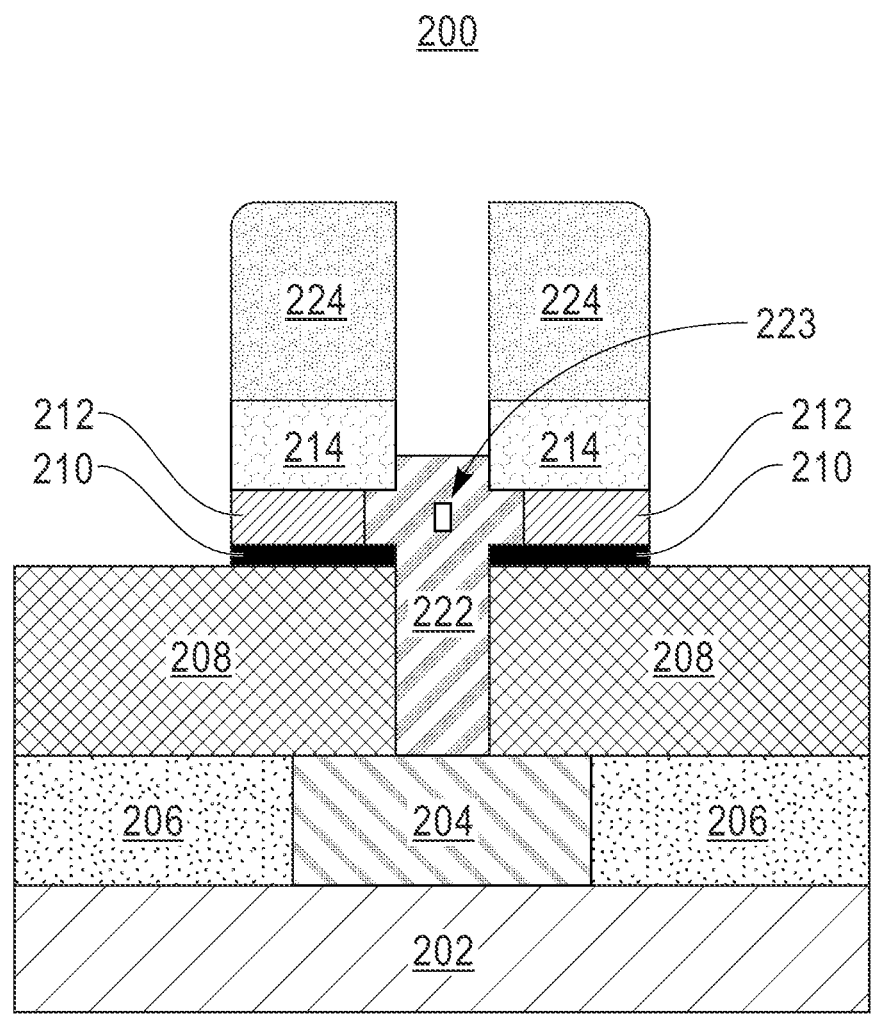
FIG. 17 is a cross-sectional schematic view illustrating a process operation following that of FIG. 15, in accordance with embodiments of the disclosure.

FIGS. 16 and 17 show the next resultant structures, which is after a portion of the heater conductor 122, 222 is recessed by etching, for example, plasma etching or wet etching. Void 223 is still present, as shown in FIG. 17.

Figure 18:
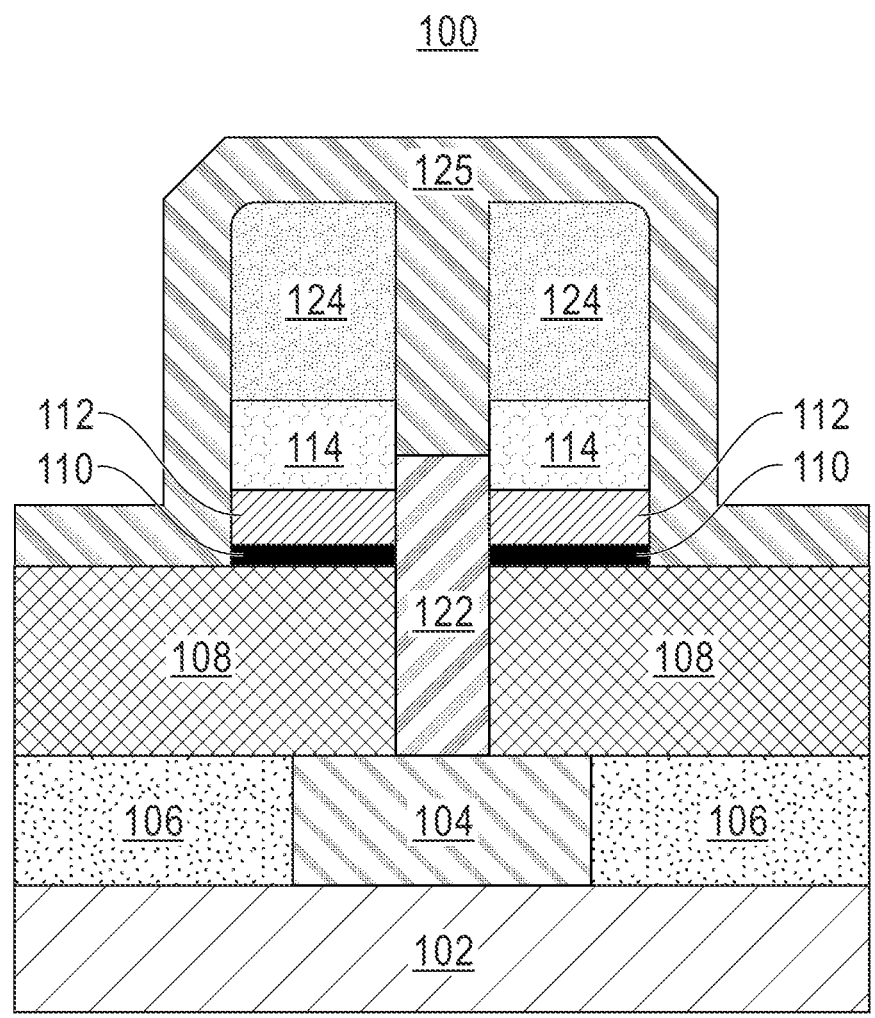
FIG. 18 is a cross-sectional schematic view illustrating a process operation following that of FIG. 16, in accordance with embodiments of the disclosure.
Figure 19:
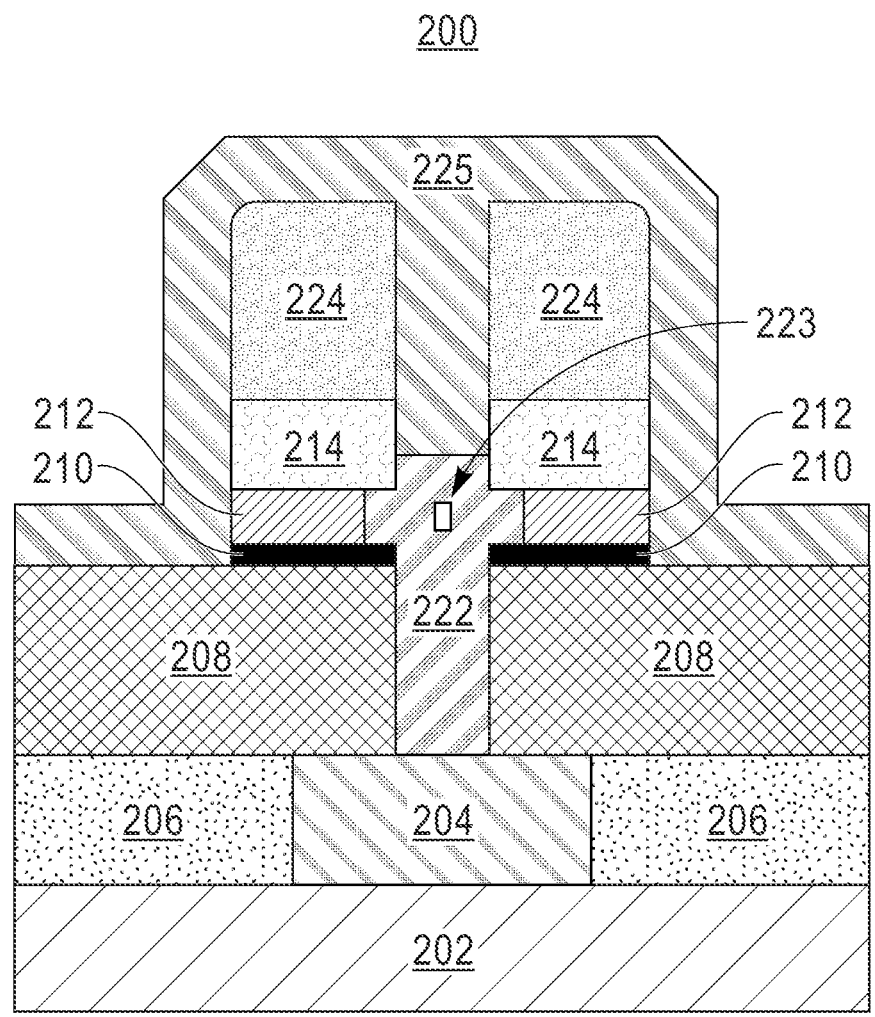
FIG. 19 is a cross-sectional schematic view illustrating a process operation following that of FIG. 17, in accordance with embodiments of the disclosure.

Next, FIGS. 18 and 19 show a dielectric cap material layer 125, 225 deposited over the top of the structures and into the vias 120, 220 where the heater conductors 122, 222 were recessed in the earlier operation of the method (see FIGS. 16 and 17). Conformal dielectric deposition, such as ALD and CVD, can be used to apply the dielectric cap material layer 125, 225. The thickness of the dielectric cap material layer 125, 225 can be more than half of the diameter of the heater conductor 122, 222 opening in order to pinch off the top of the heater conductor 122, 222. The dielectric cap material layer 125, 225 may comprise any suitable dielectric material, such as, e.g., SiN, SiON, SiOC, or SiOCN.

Figure 20:
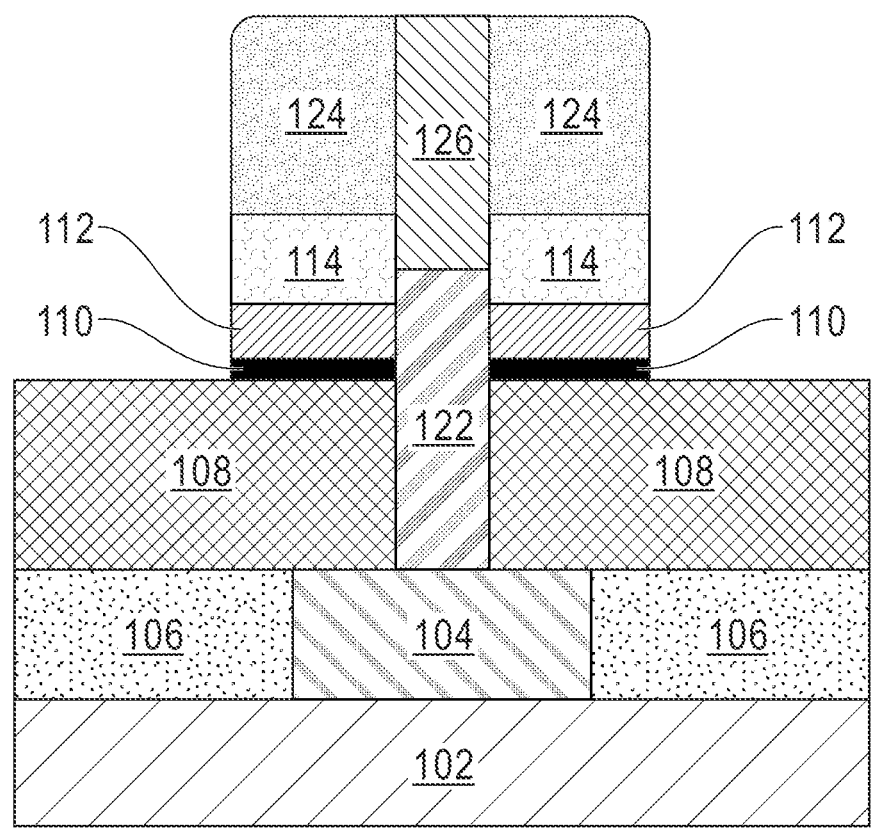
FIG. 20 is a cross-sectional schematic view illustrating a process operation following that of FIG. 18, in accordance with embodiments of the disclosure.
Figure 21:
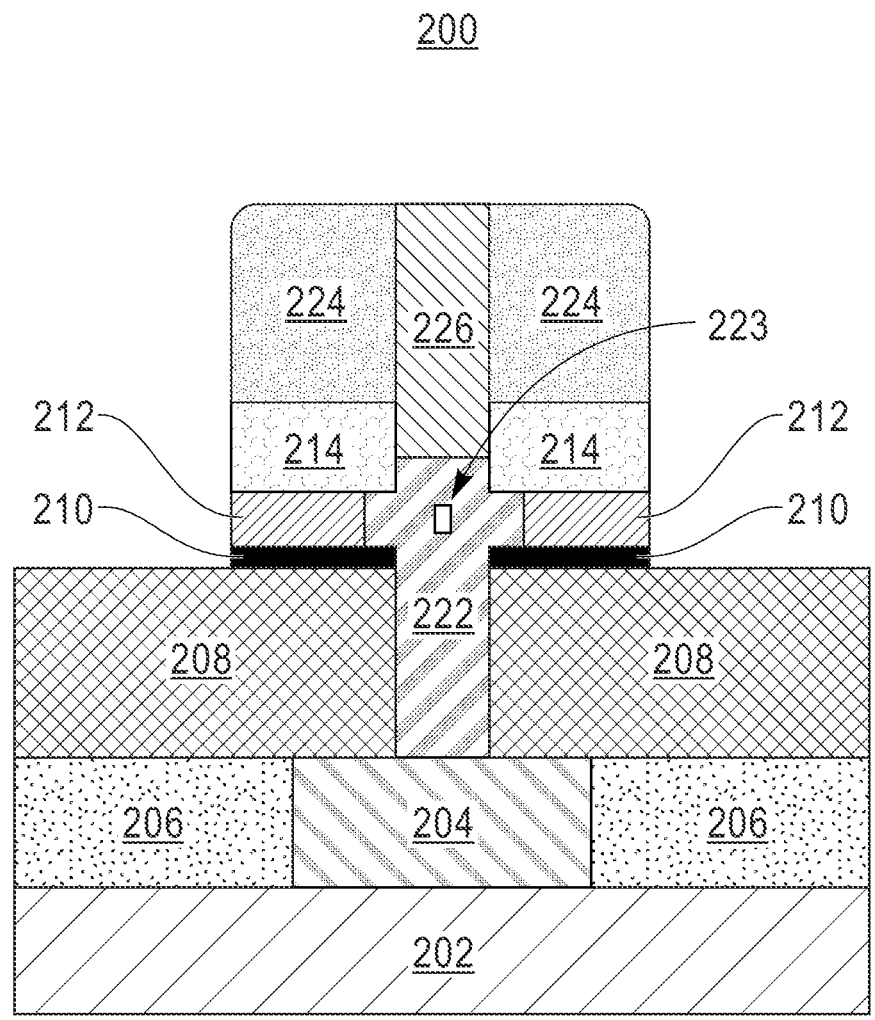
FIG. 21 is a cross-sectional schematic view illustrating a process operation following that of FIG. 19, in accordance with embodiments of the disclosure.

FIGS. 20 and 21 show the next operation in which the dielectric cap material layers 125, 225 (from FIGS. 18 and 19) are etched back to form dielectric caps 126, 226 located above the heater conductors 122, 222 within vias 120, 220. Isotropic dielectric etching may be used to form the dielectric cap 126, 226 on top of heater conductor 122, 222. As an alternative, the etching process may etch away slightly more than the deposited dielectric thickness to result in an over-etch, resulting in the dielectric cap being slightly recessed within the via (not shown).

Figure 22:
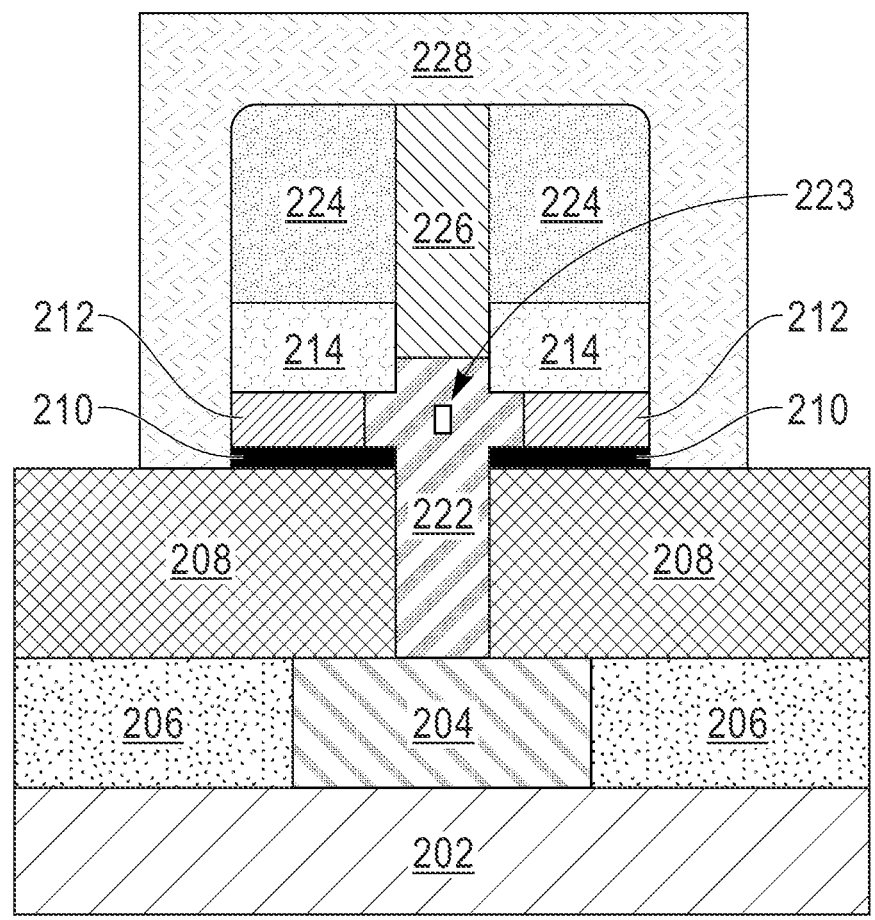
FIG. 22 is a cross-sectional view of a schematic of a memory element resulting following a process operation of FIG. 21, in accordance with embodiments of the disclosure.

FIGS. 1 and 22 show the result of the next operation in which a top electrode 128, 228 is formed on the memory elements 100, 200. The top electrode 128, 228 can be formed by deposition of the electrode material followed by patterning. The top electrode 128, 228 material can be tungsten (W), aluminum (Al), copper (Cu), cobalt (Co), nickel (Ni), titanium (Ti), ruthenium (Ru), molybdenum (Mo), or any other suitable conductive material. The metal contact can further include a barrier layer. The barrier layer can be TiN, TaN, HfN, NbN, WN, WCN, or combinations thereof. In various embodiments, the barrier layer can be deposited in the trench(es) by ALD, CVD, MOCVD, PECVD, or combinations thereof. In various embodiments, the top electrodes can be formed by ALD, CVD, PVD, and/or plating. Patterning the top electrodes can be done, for example, by RIE. Alternatively, the top electrodes can be formed by damascene process, i.e., depositing a dielectric material (not shown), forming a trench/via in the dielectric material, and filling the trench/via with a conducting material. Top electrodes 128, 228 circumferentially surround, and are connected to peripheral portions of, the phase change material layers 112, 212 and resistive liners 110, 210.

FIGS. 1 and 22 show the finished phase change memory elements 100, 200 fabricated using the method operations as described above. Memory elements 100, 200 have at least one phase change material layer 112, 212, and heater conductor 122, 22, wherein at least a portion of the heater conductor 122,222 is circumferentially surrounded by the at least one phase change material layer 112, 212. The phase change material layer 112, 212 has a donut-shape. FIGS. 2A and 2B show the donut-shape. One feature and advantage of the donut-shape of the phase change material layer 112, 212 is that the heater conductor 122, 222 is located along an inner surface of the phase change material layer 112, 212 and is surrounded by the phase change material layer 112, 212. The heater conductor 122, 222 is configured to heat a portion of the at least one phase change material layer 112, 212 and change the portion of the phase change material layer 112, 212 from a crystalline phase to an amorphous phase. The configuration of the phase change material layer 112, 212, surrounding the heater conductor 122, 222 results in a reduction in contact area compared to previous designs that had a heater conductor located underneath (and in parallel with) a phase change material layer, for example. The reduction in contact area results in a corresponding reduction in reset current. Memory elements 100, 200, also have top electrode 128, 228 circumferentially surrounding and connected to the at least one phase change material layer 112, 212, and bottom electrode 104, 204 in contact with the heater conductor 122, 222.

Memory elements 100, 200 are self-aligned as a result of the method of fabrication, and have a symmetrical arrangement. An advantage of the self-aligned, symmetrical structure is a reduction in variability of characteristics of phase change memory devices such as resistance. FIGS. 2A and 2B show the symmetrical arrangement.

Memory elements 100, 200 have at least one resistive liner 110, 210 in contact with the at least one phase change material layer 112, 212. In alternative embodiments, the resistive liners 110, 210 can be left out of memory elements 100, 200. The advantage of the symmetrical nature of the phase change memory layer 112, 212 is still present in such alternative embodiments even without the resistive liners 110, 210. The advantage of the symmetrical feature is reduction in variability. However, if the resistive liners 110, 210 are included in the memory elements 100, 200, an additional advantage of reduction of resistive drift is possible.

It will be understood that FIG. 22 presents, in schematic form, only a portion of a memory cell as finally fabricated and placed in use. Circuit elements are formed both above and below the portion shown in the figure.

Figure 23:
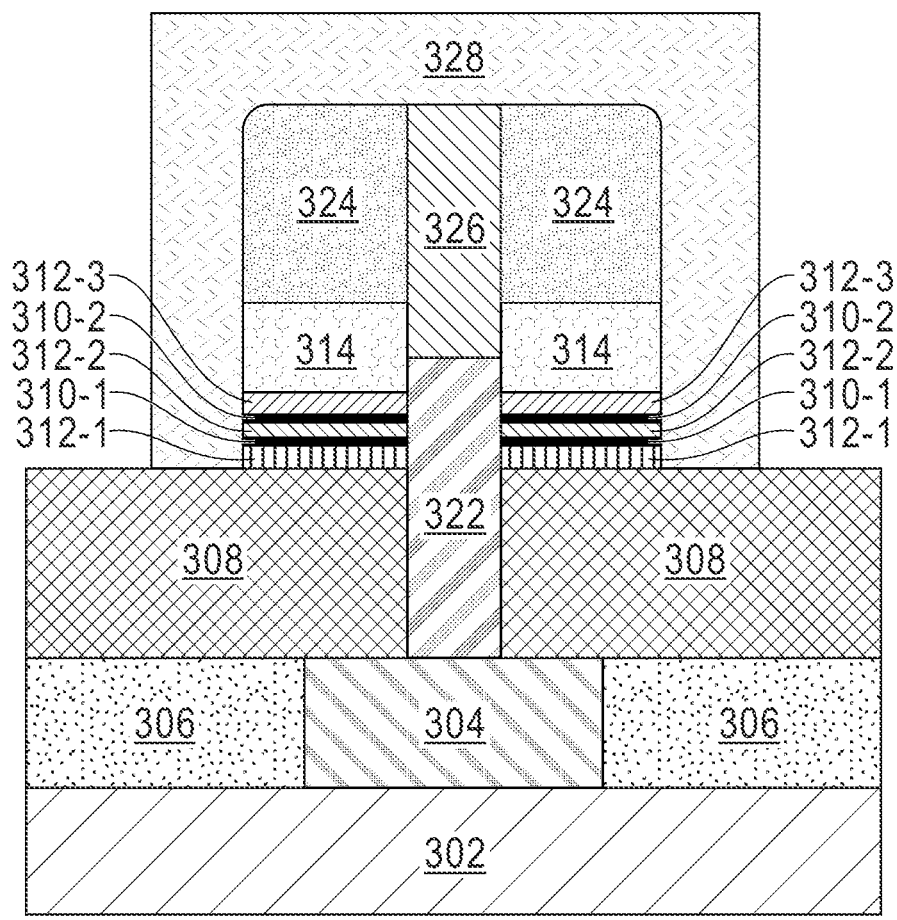
FIG. 23 is a cross-sectional view of a schematic of a memory element, in accordance with embodiments of the disclosure.

Another embodiment of the disclosure is an alternative memory element 300, and a method of fabricating the memory element 300. The layers in FIG. 23 are labelled with a "3" as their first number rather than a "1" or "2" in the earlier described embodiments, and correspond to the layers in those earlier described embodiments. The discussion of the materials and methods of forming the corresponding layers also applies to the layers in memory element 300, with the exception of the methods of forming phase change material layer 312 (i.e., 312-1, 312-2, 312-3) and resistive liner 310 (i.e., 310-1, 310-2). Instead, as shown in FIG. 23, a first phase change material layer 312-1 is deposited, followed by a first resistive liner 310-1, followed by a second phase change material layer 312-1, a second resistive liner 310-2, and a third phase change material layer 312-3. The advantage of the multiple layers of phase change material and resistive liner, in an alternating fashion, is that it enables multiple states of the phase change memory as well as fine-tuning of the material property of each layer to improve device characteristics.

It will be understood that FIG. 23 presents, in schematic form, only a portion of a memory cell as finally fabricated and placed in use. Circuit elements are formed both above and below the portion shown in the figure.

For purposes of this description, certain aspects, advantages, and novel features of the embodiments of this disclosure are described herein. The disclosed methods, and systems should not be construed as being limiting in any way. Instead, the present disclosure is directed toward all novel and nonobvious features and aspects of the various disclosed embodiments, alone and in various combinations and subcombinations with one another. The methods, and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises."

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A phase change memory element comprising:
   at least one phase change material layer;
   at least one resistive liner in contact with the at least one phase change material layer; and
   a heater conductor, wherein at least a first portion of the heater conductor is circumferentially surrounded by and in contact with the at least one phase change material layer and at least a second portion of the heater conductor is circumferentially surrounded by and in contact with the least one resistive liner.

2. The phase change memory element of claim 1, further comprising:
   a top electrode circumferentially surrounding and connected to the at least one phase change material layer.

3. The phase change memory element of claim 1, wherein the at least one phase change material layer is donut-shaped.

4. The phase change memory element of claim 1, wherein the heater conductor is configured to heat a portion of the at least one phase change material layer and change the portion of the at least one phase change material layer from a crystalline phase to an amorphous phase.

5. The phase change memory element of claim 1, further comprising:
   a bottom electrode in contact with the heater conductor.

6. The phase change memory element of claim 1, wherein the phase change memory element is symmetrical.

7. The phase change memory element of claim 1, wherein the at least one resistive liner has a resistance that is higher than that of the at least one phase change material layer in a low resistance state and lower than that of the at least one phase change material layer in a high resistance state.

8. The phase change memory element of claim 1, wherein the at least one resistive liner is adapted to migrate resistance drift in the phase change memory element.

9. A method for forming a phase change memory element comprising:
- providing a substrate;
- depositing a dielectric layer on the substrate;
- depositing a phase change material layer on the dielectric layer;
- depositing a resistive liner in contact with the phase change material layer;
- forming a via through the dielectric layer, and the phase change material layer; and the resistive liner;
- forming a heater conductor within the via, wherein at least a first portion of the heater conductor is circumferentially surrounded by and in contact with the phase change material layer and a second portion of the heater conductor is circumferentially surrounded by and in contact with the resistive liner;
- patterning the phase change material layer; and
- forming a top electrode circumferentially surrounding and connected to the phase change material layer.

10. The method of claim 9, further comprising:
- forming a spacer around an upper portion of the heater conductor; and
- using the spacer to pattern the phase change material layer.

11. The method of claim 9, further comprising:
- forming a bottom electrode within the dielectric layer and in contact with the heater conductor.

12. The method of claim 9, wherein the phase change memory element is symmetrical.

13. The method of claim 9, further comprising:
- exposing an upper portion of the heater conductor;
- forming a spacer around the exposed upper portion of the heater conductor; and
- using the spacer to pattern the phase change material layer.

14. The method of claim 13, further comprising:
- recessing a portion of the heater conductor within the via; and
- forming a dielectric cap in a location where the recessed portion of the heater conductor was located.

15. A method for forming a phase change memory element comprising:
- providing a substrate;
- depositing a dielectric layer on the substrate;
- depositing at least one phase change material layer on the dielectric layer;
- depositing at least one resistive liner on the at least one phase change material layer;
- forming a via through the dielectric layer, the at least one phase change material layer, and the at least one resistive liner;
- forming a heater conductor within the via, wherein at least a portion of the heater conductor is circumferentially surrounded by the at least one phase change material layer and the at least one resistive liner;
- patterning the at least one phase change material layer and the at least one resistive liner; and
- forming a top electrode circumferentially surrounding and connected to the at least one phase change material layer and the at least one resistive liner.

16. The method of claim 15, further comprising:
- exposing an upper portion of the heater conductor;
- forming a spacer around the exposed upper portion of the heater conductor; and
- using the spacer to pattern the at least one phase change material layer and the at least one resistive liner.

17. The method of claim 16, further comprising:
- recessing a portion of the heater conductor within the via; and
- forming a dielectric cap in a location where the recessed portion of the heater conductor was located.

18. The method of claim 15, further comprising:
- forming a bottom electrode within the dielectric layer and in contact with the heater conductor.

19. The method of claim 15, wherein a first phase change material layer is deposited on the dielectric layer, followed by a first resistive liner deposited on the first phase change material layer, followed by a second phase change material layer deposited on the first resistive liner, followed by a second resistive liner deposited on the second phase change material layer, and followed by a third phase change material layer deposited on the second resistive liner.

20. The method of claim 15, wherein the phase change memory element is symmetrical.

* * * * *